Patented Oct. 21, 1952

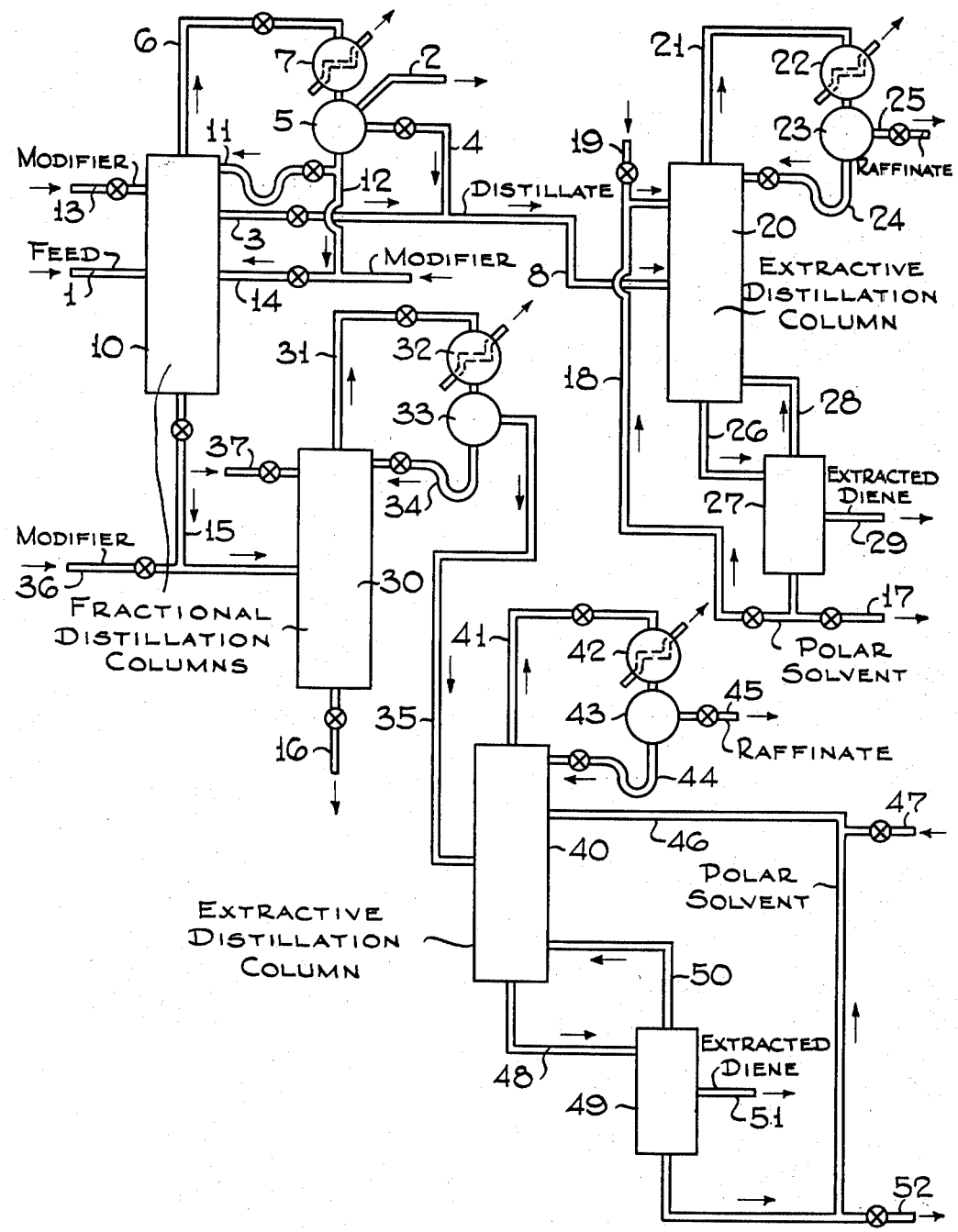

2,614,969

UNITED STATES PATENT OFFICE 2,614,969

PROCESS FOR SEPARATING C₅ DIOLEFINS

Charles E. Morrell, Westfield, and Lester M. Welch, Madison, N. J., assignors to Standard Oil Development Company, a corporation of Delaware Application October 22, 1948, Serial No. 56,042

7 Claims. (Cl. 202—39.5)

This invention relates to a method for separating and concentrating $C_5$ diolefins from their hydrocarbon mixtures containing other types of hydrocarbons, such as present in a cracked petroleum naphtha fraction. More particularly, it is concerned with the recovery of purified diolefins, such as isoprene, cyclopentadiene and piperylene.

Hitherto, efficient recovery of the individual diolefins, isoprene and its higher boiling homologs, has involved a difficult fractional distillation problem of obtaining cuts that would contain the desired diolefins in maximum amounts with the least amount of close-boiling contaminants. For example, in obtaining an isoprene-rich $C_5$ fraction from a cracked petroleum naphtha by fractional distillation it is very difficult to prevent the mono-olefin components trimethylethylene and even cyclopentene from being present because of their similar volatilities in the fraction taken. Despite the somewhat higher boiling points of such contaminants in pure state, their volatilities become changed or modified by the presence of other components, and in subsequent stages of the separation process it is difficult to eliminate them.

Due to the difficulty of separating the hydrocarbons by fractional distillation, extractive distillation with various polar solvents has been employed in subsequent stages, but the mentioned troublesome mono-olefins tend to remain with the diolefins even in the presence of the polar solvents.

In accordance with the present invention, the concentration and purification of the $C_5$ diolefins is improved by subjecting the $C_5$ diolefin-containing fractions to modified fractional distillations by admixing relatively large amounts of paraffins of similar or lower volatilities for depressing the volatilities of the more troublesome mono-olefins, especially in a fractional distillation zone where the unsaturated hydrocarbons undergo rectification. There are certain advantages in using, as the fractional distillation modifier, $C_5$ paraffins which distill together with the diolefins being separated as a distillate, because these paraffins tend to concentrate in the rectification zone and then are easily removed from the diolefin distillate on subsequent extractive distillation using a polar solvent. There are certain other advantages in using relatively higher boiling $C_5+$ paraffins as modifiers, by introducing them to an upper part of the rectification zone where they tend to increase the volatilities of the diolefin, although they also dilute the residual hydrocarbons.

The appropriate manner of selecting and utilizing the modifiers and their respective advantages will be further explained in discussing the operation of the invention with reference to the accompanying drawing, which is a schematic flow plan of apparatus for employing the various types of fractional distillation modifiers in conjunction with subsequent extractive distillations.

In the drawing, the distillation system is illustrated for treatment of an isoprene-rich $C_5$ fraction to eliminate the troublesome trimethylethylene and cyclopentene, when separating and purifying isoprene, or for treatment of wider boiling fractions, e. g., a $C_5$ to $C_{10}$ naphtha fraction to do likewise, while at the same time providing for the recovery of other purified diolefin components, such as, piperylene and cyclopentadiene free of both the troublesome mono-olefins, trimethylethylene and cyclopentene.

The isoprene-containing fraction of narrow or wide boiling range is introduced from feed line 1 into an intermediate part of the distillation column 10, which may be constructed and equipped with conventional means, such as bubble plates and reboiler.

Fractionated vapors of isoprene being separated from close-boiling mono-olefins, trimethylethylene and cyclopentene, pass upwardly through the rectification zone in the upper part of column 10 from the feed plate. Isoprene-rich distillate may be removed as a side-stream from one of the top plates, e. g., through line 3 or may be withdrawn by line 4 from receiver 5 of overhead product that has passed from the top of column 10 by line 6 through a cooling condenser 7.

The overhead product from column 10 need be only partially condensed in condenser 7 for obtaining liquid reflux and the remainder of the overhead product in vapor phase may then be passed by line 4 from receiver 5 and by line 8 to the extractive distillation column 20. If gaseous $C_4$ hydrocarbons are in the overhead product from column 10, then it becomes desirable to condense the isoprene-containing $C_5$ overhead product and vent the C₄ gases from the receiver 5 through pipe 2.

A portion of condensate is returned as reflux from receiver 5 by line 11 to the top plates of column 10. Another portion of liquid distillate, which contains a high proportion of $C_5$ paraffins may be advantageously returned by line 14 to column 10 at or near the feed plate, from which their vapors ascend to build up the concentration of $C_5$ paraffins on the upper plates. However, as a substantial amount of the $C_5$ paraffins, or pentanes, are withdrawn together with isoprene and lower boiling pentenes in the distillate, it is necessary to add more pentanes as modifier, e. g. through line 14 in order to maintain the required high concentration of paraffins for depressing the volatility of the close-boiling olefins, trimethylethylene and cyclopentene, unless a higher boiling paraffin modifier is introduced at the upper part of column 10 by line 13.

It will be noted that there are at least three different ways in which the paraffinic volatility modifiers having at least 5 carbon atoms per molecule can be supplied to the rectification zone of column 10, but the efficient use of each way is dependent on the type of feed processed and particular paraffin mainly used as a modifier. If the modifier mainly used is isopentane, the fractional distillation column may be operated to make the overhead product contain principally isopentane, and the isopentane condensate is advantageously refluxed to a plate near the feed plate, or at least below the plate from which an isoprene-rich distillate side-stream is withdrawn by line 3 so that the isoprene will not be excessively diluted by isopentane. If normal pentane is used mainly as a modifier, it may be returned largely with reflux passed from receiver 5 through line 11. Additional quantities of the pentanes employed as modifiers may be admixed with the feed or be introduced by line 14.

In using the less volatile paraffinic modifiers such as hexanes or paraffinic naphtha or paraffinic kerosene hydrocarbons, they are essentially introduced into the upper part of the column, e. g., by line 13, preferably below the side stream plates and are then withdrawn as diluent in the residual hydrocarbons removed from the bottom of column 10 by line 15 for further processing.

In any event, the concentration of the $C_5$ or higher paraffinic hydrocarbons is continuously maintained sufficiently high in the rectification zone of columns 10 so that the volatility of the troublesome olefins, trimethylethylene and cyclopentene is depressed, and these olefins are thus retained in liquid residual bottoms while the fractional distillation is conducted so that the isoprene is distilled together with pentanes and lower boiling pentenes. Some of the pentanes and some of the low boiling pentenes also tend to remain in the liquid residue containing the trimethyl ethylene and cyclopentene as well as the diolefins higher boiling than isoprene from the feed, i. e., cyclopentadiene and piperylene, but less of the pentanes and normal pentenes remain in this residue than if the less volatile $C_5+$ paraffins are used as modifiers.

The isoprene distillate or overhead vapor fraction from column 10 is of suitable composition for segregating specification quality isoprene therefrom by extractive distillation using the common polar solvents without the interference that would arise from the presence of trimethylethylene or of cyclopentene.

Extractive distillation with a polar solvent is not novel per se but is improved in its efficiency for separating the various $C_5$ diolefins by the treatment of this invention. The extractive distillation includes the use of known types of operations and polar solvents, such as aqueous acetone, sulfolanes, furfural, or the like, which have selective high solvency for diolefins but which at the same time tend to extract the troublesome mono-olefins that are close-boiling to but somewhat higher boiling than the diolefin being extracted, if they are present with the diolefin, as is shown in the following tabulated data:

TABLE I

*Volatility relationships of $C_5$ hydrocarbons*

| Hydrocarbon Component | Wt. Percent in $C_5$ Fraction | Boiling Point @ 25 p.s.i.g. °F. | Relative Volatility | |
|---|---|---|---|---|
| | | | Normal [1] | With Solvent [2] |
| Pentene-1 | 35.9 | 145 | 1.06 | 1.52 |
| 2-Methylbutene-1 | 7.4 | 147 | 1.03 | 1.47 |
| Isoprene | 14.9 | 153 | 1.00 | 1.00 |
| Pentenes-2 [3] | 7.4 | 156 | 0.92 | 1.30 |
| n-Pentane | 2.9 | 156 | 0.92 | 1.43 |
| Trimethylethylene | 8.4 | 160 | 0.88 | 1.26 |
| Cyclopentadiene | 4.9 | 165 | 0.83 | 0.83 |
| Piperylene [3] | 10.6 | 169 | 0.76 | 0.76 |
| Cyclopentene | 7.7 | 172 | 0.73 | 1.06 |
| Cyclopentane | 0.4 | 180 | 0.67 | 1.04 |

[1] Based on normal vapor pressures, uncorrected for abnormal deviations.
[2] 2 vols. solvent (92 wt. percent acetone, 8 wt. percent water) per vol. hydrocarbon in liquid phase.
[3] Cis and trans. average.

The figures in the third column of Table I show that while the other $C_5$ diolefins are considerably less volatile than isoprene, n-pentane and the near-boiling $C_5$ olefins have normal volatilities ranging from 0.88 to 1.06 with respect to isoprene. Thus, while it is practical to separate isoprene from other $C_5$ diolefins by ordinary fractional distillation, equipment of impractical dimensions would be required to separate the isoprene from these near boiling mono-olefins. Consequently, it has been found necessary to use extractive distillation in the presence of polar solvents (e. g. acetone or others) for increasing the relative volatilities of the near-boiling mono-olefins to permit their removal from the isoprene. But even so, there has been the remaining difficulty that the higher boiling mono-olefins, trimethylethylene and cyclopentene are difficult to remove from the diolefins by extractive distillation, and then cannot be separated from the diolefins by further fractionation afterwards. Trimethylethylene is the most troublesome contaminant with respect to isoprene, and cyclopentene is most troublesome with respect to cyclopentadiene and piperylene. Moreover, even some cyclopentadiene tends to remain with the isoprene concentrate obtained on ordinary distillation and an extractive distillation in the presence of polar solvents subsequent to ordinary distillation.

The isoprene-rich cut obtained by the modified fractional distillation in column 10 has the trimethylethylene, cyclopentene, cyclopentadiene, and piperylene substantially eliminated, so that when this isoprene-rich cut is subjected to extractive distillation with a polar solvent in column 20, the isoprene is readily separated from the pentanes and other pentenes present in this cut and is thus obtained in high purity with good recovery.

The polar solvent, which is largely recycled lean solution from line 18 and fresh make-up solvent from line 19 is introduced into the upper part of column 20 so as to reflux countercurrently to the hydrocarbon vapors from the hydrocarbon feed introduced by line 8. The pentenes and pentanes, of increased volatility relative to the isoprene pass overhead from column 20 by line 21 through cooling condenser 22, and condensate collected in receiver 23. Some of the condensate is returned as reflux from the receiver 23 by line 24 and a remaining portion of the distilled pentenes and pentanes is withdrawn as raffinate from receiver 23 by line 25.

It may be noted that raffinate from extraction column 20 makes a good source of the pentane modifying agent useful in column 10. The pentenes can be separated from the pentanes in the raffinate by any suitable process, such as polymerization, to remove the olefins and concentrate the pentanes before they are returned to column 10.

The extracted isoprene dissolved in the bottoms extract solution of column 20 is recovered by passing this bottoms from lower part of column 20 through line 26 into the upper part of the stripping and fractionating vessel 27 where the extract solution becomes first stripped of any remaining pentenes and pentanes, and those volatilized components of the solution are returned to column 20 by line 28. In a lower part of vessel 27, the isoprene is desorbed from the extract solution and the isoprene vapors are removed as a side stream through line 29, leaving a lean extract solution or polar solvent bottoms for recycling by line 18 to an upper part of column 20. A portion of the lean solution may be withdrawn for clean-up through line 17.

The residual fraction containing trimethylethylene, cyclopentadiene, piperylenes, cyclopentene and higher boiling hydrocarbons in column 10 is next most effectively treated for separating the desired diolefins by a fractional distillation that is again modified through the use of the paraffins which depress the volatilities of the trimethylethylene and cyclopentene so as to avoid complications in a following extractive distillation of the diolefins contained in this residual fraction.

Thus, when the residual fraction is passed from the bottom of column 10 by line 15 into the fractional distillation column 30 supplied with modifying paraffin, cyclopentadiene and piperylene is distilled overhead with any pentanes and lower boiling pentenes, including trimethylethylenes, but cyclopentene is made to remain in the residue discharged through line 16.

The diolefin-rich vapors freed of cyclopentene pass overhead from column 30 by line 31 through cooler 32 for total or partial condensation. Some of the condensate from receiver 33 is refluxed to column 30 by line 34, and a remaining portion of the distillate or overhead vapor is passed along by line 35 to a subsequent extractive distillation unit 40.

The distillation modifying paraffins can be supplied to column 30, as they are supplied to column 10, e. g., low boiling $C_5$ paraffins by line 36, high boiling $C_5+$ paraffins by line 37.

As in the extractive distillation carried out on the isoprene distillate in column 20, extractive distillation with a polar solvent is performed in column 40 to remove pentanes and the pentenes lower boiling than the diolefins overhead from column 40 by line 41 through condenser 42 to receiver 43, whence a portion of condensate is refluxed by line 44 to an upper part of column 40 and a remaining portion is withdrawn as raffinate by line 45.

The polar solvent, recycled by line 46 and any fresh make-up solvent from line 47, enters a top part of column 40 to pass countercurrently to vapors from the hydrocarbons entering onto a feed plate from line 35. Extract solution is withdrawn as bottoms by line 48 to the upper part of the stripping and desorption vessel 49, where some volatile hydrocarbons are released and returned with some diolefin and solvent vapors into the bottom part of column 40 by line 50. In a desorption zone, at the lower part of vessel 49, the piperylene with some cyclopentadiene are desorbed and removed as a vapor side-stream through line 51 for recovery. The lean solution or solvent bottoms is recycled by line 46 except for a portion removed by line 52 for clean-up and reconcentrating.

With the general operability of the process for separating trimethylethylene from isoprene and of separating cyclopentene from the higher $C_5$ diolefins demonstrated, engineering of the process is carried out to suit the needs of the particular feed materials available, each of the distillation columns and of the stripping and desorption vessels being made of adequate size with a suitable number of plates.

For example, the initial separation of an isoprene-rich distillate free of trimethylethylene is carried out in column 10 by having a cracked naphtha or $C_5$ fraction enter near the middle of the column 10 having a top temperature of about 140° F. at 25 p. s. i. g. and a higher bottoms temperature. A reflux ratio of about 7:1 or up to about 10:1 is maintained. By increasing the paraffin content of the liquid undergoing rectification in the upper part of the column, preferably through addition of isopentane or higher boiling paraffins, the amount of trimethylethylene that ordinarily tends to pass overhead with distilled isoprene is diminished, and when this paraffin content is increased to above 40 mol % in liquid on upper plates of the column, the amount of trimethylethylene collected with the isoprene distillate is negligible. The residual bottoms fraction continuously withdrawn contains the higher boiling $C_5$ diolefins, low and high boiling paraffins, some of the normal pentenes, the trimethylethylene, cyclopentene, cyclopentane, and any of the $C_6$ and higher hydrocarbons which were present in the initial feed.

Carrying out the modified fractional distillation of the residual bottoms fraction from column 10 in column 30, the feed is introduced at a middle point of column 30 with a top temperature of about 160° F. at 25 p. s. i. g., and a higher bottom temperature, with a reflux ratio of about 1:10. By increasing the paraffin content of the liquid undergoing rectification in the upper part of column 30, the amount of cyclopentene that tends to pass overhead with the distilled cyclopentadiene and piperylene is diminished and when this paraffin content is increased to about 40 mol %, the amount of cyclopentene collected with the distillate is negligible although the trimethylethylene distills over with these diolefins. The cyclopentene remains in the residue with higher boiling paraffins and $C_6+$ hydrocarbons.

The following data in Table II shows how the presence of cyclopentene would make the separation of the diolefins substantially impossible in the extractive distillation of the close-boiling diolefins, cyclopentadiene and piperylene, considering that a relative volatility of the order of 1.2 to 1.3 for the component being distilled with respect to the component to be retained in the residue is necessary.

TABLE II

| Hydrocarbon Component | Relative Volatilities relative to trans-piperylene | |
|---|---|---|
| | Normal [1] | With Aqueous Acetone [2] |
| Cyclopentane | 0.78 | 1.46 |
| Trimethylethylene | 1.11 | 1.47 |
| Neohexane | 0.77 | 1.29 |
| Cyclopentadiene | 1.02 | [3] 0.64–0.94 |
| Cyclopentene | 0.94 | 1.17 |

[1] At atmospheric pressure with no polar solvent.
[2] At 25 p. s. i. g., 2 parts solvent to one of hydrocarbons.
[3] 0.94 with no polymerization, 0.64 for polymers.

Thus it can be seen that by elimination of cyclopentene in the prior fractional distillation modified through the addition of paraffins then in the extractive distillation the difficulty of removing cyclopentene is avoided and the other olefins and paraffins are increased in volatility sufficiently by the polar solvent to eliminate them as part of the raffinate.

The desired $C_5$ diolefins, useful in synthetic rubber, resin, and other manufacturing processes if they are of adequately high purity, are formed in relatively small quantities by high temperature cracking of petroleum hydrocarbon oils, and they appear in distillate products containing mono-olefins, paraffins and large amounts of aromatics. The debutanized aromatic distillates often contain about 20 wt. % of $C_5$ hydrocarbons with $C_6$—$C_{10}$ hydrocarbons, the $C_5$ hydrocarbons and their typical proportions being indicated in Table I.

In processing the $C_5$—$C_{10}$ cracked distillates to concentrate and purify the $C_5$ diolefins, a narrow $C_5$ cut may first be obtained, but it is more economical to eliminate any first step of superfractionation which requires large fractionation equipment for the initial large amount of material.

With the process of the present invention the $C_5$ cut may first be obtained or the debutanized naphtha containing $C_5$—$C_{10}$ hydrocarbons can be subjected to the major steps already outlined and summarized as follows:

(1) Modified fractional distillation of the $C_5$ cut or a naphtha fraction containing the $C_5$ hydrocarbons, using $C_5$ or higher paraffins to depress the volatilities of trimethylethylene and cyclopentene to obtain an isoprene-rich distillate free of these troublesome mono-olefins.

(2) Extractive distillation of the isoprene-rich distillate from the modified fractional distillation to recover isoprene free of trimethylethylene, which is kept in the bottoms of step (1) with piperylenes, cyclopentadiene and cyclopentene.

(3) Modified fractional distillation of a $C_5$ or debutanized naphtha fraction freed of isoprene but containing cyclopentadiene and piperylenes contaminated by cyclopentene as in the bottoms of step (1), using $C_5$ or higher paraffins to depress the volatility of the cyclopentene relative to the diolefins.

(4) Extractive distillation of the cyclopentadiene and piperylenes free of cyclopentene to remove other close-boiling paraffins and mono-olefins, including trimethylethylene.

The separation of isoprene from its most troublesome contaminant, trimethylethylene, in the first step by the modified fractional distillation has been demonstrated to be due to changes in relative volatilities responsive to increased concentrations of the paraffins as shown in the following summarized data:

TABLE III

| Hydrocarbon Component | Relative Volatilities | | |
|---|---|---|---|
| | Normal | Modified By n-Pentane | By Isopentane |
| Pentene-1 | 1.14 | 1.04 | 0.98 |
| Isoprene | 1.00 | 1.00 | 1.00 |
| Trimethylethylene | 0.88 | 0.82 | 0.81 |

The above listed relative volatilities are based on experimental data of the volatilities of the components to n-pentane and isopentane, respectively, as the liquid content of the paraffin is increased to above 40 mole %, in two-component systems of the unsaturated hydrocarbons and the paraffins, the normal relative volatility of isopentane being of the order of 1.26 with respect to isoprene, which is given the base value of 1.00 for its volatility.

In a three-component system containing isopentane, isoprene, and trimethylethylene, it was found experimentally that the volatility of the trimethylethylene with respect to isoprene was lowered still further to 0.77. Thus, with the relative volatility isoprene to trimethylethylene at 1.3, (1/0.77) the separation of isoprene is made possible with practical fractionating equipment.

In the second major step, the volatilities of mono-olefins are reduced relative to those of the diolefins by increased amounts of a paraffin for modifying the fractional distillation. Again using the volatility of isoprene as a base (1.00), the summarized data given in the following table shows how the mono-olefin cyclopentene, most troublesome with respect to piperylene and cyclopentadiene, is given a sufficiently lowered relative volatility so that it is readily kept in the residue, while the trimethylethylene of similarly depressed in volatility will volatilize with these diolefins:

TABLE IV

| Hydrocarbon Component | Relative Volatilities | |
|---|---|---|
| | Normal | Modified By n-Pentane |
| Trimethylethylene | 0.88 | 0.82 |
| Cyclopentadiene | 0.83 | 0.80 |
| Piperylene | 0.76 | 0.79 |
| Cyclopentene | 0.73 | 0.6 |

In Table IV the relative volatility values are based on calculations from observed volatilities of binary systems containing one of the listed olefinic components and the paraffin in concentrations increased to above 40 mole %. The figures given shows the trend by which the diolefins are made more volatile and the mono-olefins are made relative less volatile by the paraffin. For example, if no paraffin is present in a system of trimethylethylene and cyclopentadiene, the trimethylethylene is about 1.05 times more volatile than the cyclopentadiene, whereas in the presence of the added paraffin the cyclopentadiene is about as volatile as the trimethylethylene, and at the same time, more volatile than the cyclopentene. In the more complex mixtures the modifying effect of the paraffin is indicated to be even more accentuated for assisting the separation of the $C_5$ diolefins from cyclopentene.

Although trimethylethylene distills over with the cyclopentadiene and piperylene in the modified fractional distillation (step 3) using paraffins for depressing the volatility of the cyclopentene in the fourth major step of extractively distilling the distillate containing cyclopentadiene and piperylene with a polar solvent, the relative volatility of the trimethylethylene is sufficiently high with respect to these diolefins so that the trimethylethylene is distilled over as part of the raffinate.

A large variety of alternative polar solvents may be used in each of the extractive distillation steps, although aqueous acetone is chosen as a preferred solvent. The other polar solvents, such as, glycol diformate, acetonitrile, furfural, sulfolanes, etc. well known in the art are similarly effective in lowering the volatilities of the diolefins relative to close-boiling paraffins and mono-olefins but nevertheless are difficult to use for separating trimethylethylene from isoprene and for separating cyclopentene from cyclopentadiene and from piperylene.

It will be understood by those skilled in the art that regardless of what kind of extractive distillation or finishing process is employed, the fractional distillation modified by the addition of paraffin hydrocarbons having at least 5 carbon atoms, e.g. pentanes and their higher homologs, as provided herein, is a useful method for segregating a $C_5$ diolefin from a close higher boiling $C_5$ mono-olefin. This modification in the fractional distillation of mixtures containing $C_5$ diolefins and mono-olefins can be varied to suit the needs for the mixtures treated by varying the amounts and kind of paraffin employed as modifier although for typical cracked petroleum fractions which contain fairly small amounts of paraffins indigenously, the added amount of this modifier is such as to give at least a concentration of 40 mole % of paraffins in liquids on the rectification zone plates.

What is claimed is:

1. In the separation and purification of isoprene from a mixture containing lower boiling pentenes and trimethylethylene, the improvement, which comprises fractionally distilling an isoprene-rich cut containing the lower boiling pentenes from the mixture with admixed isopentane so as to leave the trimethylethylene in a residual portion of the mixture, said isopentane being admixed in a proportion of at least 40 mole % of liquid undergoing fractional distillation, and thereafter fractionally distilling the lower boiling pentenes from the isoprene-rich cut in the presence of a polar solvent which extracts the isoprene.

2. A method of treating a $C_5$ hydrocarbon fraction containing isoprene, normal pentene, pentanes and trimethylethylene, which comprises fractionally distilling the isoprene with the normal pentene and pentanes from said fraction in the presence of added paraffin hydrocarbon of 5 carbon atoms per molecule to reduce the volatility of the trimethylethylene relative to the volatility of the isoprene, adding a sufficient amount of said paraffin hydrocarbon to maintain a proportion of at least 40 mole % of paraffins having at least 5 carbon atoms per molecule in liquid phase portions of said fraction undergoing fractional distillation, separating a distillation cut containing the isoprene, normal pentene, and pentanes volatilized from said liquid portions of the fraction undergoing fractional distillation, and recovering the trimethylethylene in a residual liquid portion of said fraction in which remains a portion of said added paraffin hydrocarbon.

3. The method of claim 2, in which isopentane is the added paraffin hydrocarbon.

4. The method of claim 2 in which the added paraffin hydrocarbon is isopentane, and in which isopentane is cooled as an overhead distillate, then is returned to the fractional distillation.

5. In the separation and purification of isoprene from a liquid mixture containing pentene-1, trimethylethylene, cyclopentadiene, and cyclopentene, the improvement which comprises fractionally distilling the isoprene with the pentene-1 from the liquid mixture in a fractional distillation zone, while giving liquids in said fractional distillation zone a content of at least 40 mole % of paraffins having 5 carbon atoms per molecule by addition of said paraffins, withdrawing from said fractional distillation zone isoprene mixed with pentene-1 and withdrawing from said fractional distillation zone a residual portion of said liquids containing the trimethylethylene and cyclopentadiene mixed with at least a portion of said added paraffins.

6. In the separation and purification of isoprene and piperylene initially mixed with $C_5$ mono-olefins and $C_5$ paraffins, the improvement which comprises separating an isoprene-rich cut containing isoprene with $C_5$ paraffins and lower boiling $C_5$ mono-olefins from said mixture by fractional distillation in the presence of added paraffins having 5 carbon atoms per molecule, said added paraffins being admixed to give the liquid mixture a content of at least 40 mole % of the paraffins during the fractional distillation so that trimethylethylene remains in a residual portion of the liquid mixture undergoing fractional distillation, then fractionally distilling a piperylene-rich cut from said residual portion containing trimethylethylene, cyclopentadiene, and cyclopentene in the presence of added $C_5$ paraffins forming at least 40 mole % of liquids from which the piperylene is being distilled so that cyclopentene remains in a resulting bottoms portion, fractionally distilling trimethylethylene from said piperylene-rich cut by extractive distillation in the presence of a polar solvent and fractionally distilling piperylene from the polar solvent extract of the piperylene-rich cut to obtain a final piperylene distillate freed of isoprene and trimethylethylene and of cyclopentene.

7. In the separation and purification of piperylene from a mixture containing trimethylethylene and cyclopentene, the improvement which comprises adding to said mixture a $C_5$ paraffin hydrocarbon in an amount to make $C_5$ paraffin hydrocarbons form at least 40 mole % of the resulting liquid mixture, and fractionally distilling the piperylene with the trimethylethylene and $C_5$ paraffin so as to leave the cyclopentene in a residual portion of the mixture, thereafter fractionally distilling the trimethylethylene with $C_5$ paraffin from the piperylene by extractive distillation in the presence of a polar solvent for piperylene, then distilling piperylene from the resulting polar solvent extract of the piperylene to obtain a piperylene distillate freed of trimethylethylene and of cyclopentene.

CHARLES E. MORRELL.
LESTER M. WELCH.

REFERENCES CITED

The following references are of record in the file of this patent:

UNITED STATES PATENTS

| Number | Name | Date |
|---|---|---|
| 2,123,642 | Gaylor | July 12, 1938 |
| 2,361,493 | Patterson | Oct. 31, 1944 |
| 2,372,941 | Evans | Apr. 3, 1945 |
| 2,407,997 | Patterson | Sept. 24, 1946 |
| 2,426,705 | Patterson et al. | Sept. 2, 1947 |
| 2,433,286 | McKinnis | Dec. 23, 1947 |
| 2,434,424 | Morris et al. | Jan. 13, 1948 |
| 2,465,047 | Tooke et al. | Mar. 22, 1949 |